Patented Apr. 19, 1932

1,854,744

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

PRODUCTION AND RECOVERY OF DISPERSED SUBSTANCES

No Drawing.   Application filed November 27, 1925. Serial No. 71,837.

My invention relates to the production of substances in dispersed form and possessing other desired physical characteristics and in a state or condition in which they can be used or further treated, and it relates particularly to a process whereby substances are produced by forming a precipitate in an operation that can be so regulated as to control the physical properties of the resulting precipitate and then bringing the precipitate to a condition or state in which it can be used for desired purposes or subjected to further treatment.

Numerous substances of commercial valve are produced by relatively slow and complicated and expensive processes in order that the substances will be produced in the desired physical form, although substances of the same chemical composition and not possessing the desired physical form can readily be produced, as by precipitation from an equeous solution. For example, commercial white lead, namely, basic lead carbonate is produced by several relatively slow and expensive processes in order that the basic lead carbonate will possess the physical properties necessary in order that the final product may be used in paint, whereas basic lead carbonate of the same chemical composition as the basic lead carbonate used in paint, but possessing physical properties that render it much less valuable for such use, can very readily be precipitated from a water solution of a water-soluble lead salt.

An important object of my invention is to provide a process whereby substances in a dispersed state or condition and possessing other desired physical characteristics are produced by forming a precipitate comprising the desired substances or comprising a material from which the desired substances may readily be produced and then bringing the precipitate to a desired condition or state. Further objects of my invention are to provide a method of precipitation whereby a precipitate is formed by chemical action or change of temperature or otherwise in a finely divided or dispersed state as contrasted with a precipitate of agglomerate or flocculent or curdy or other undispersed form and whereby the formation of the precipitate can be so regulated as to control or determine physical properties of the precipitate and whereby the precipitate so formed can be separated from the mixture produced in the operation in which the precipitate is formed and can be brought to a desired state or condition in which it can be used or subjected to further treatment.

In the practice of my invention the desired substance or a material from which the desired substance may be readily produced is precipitated in an operation or under circumstances or conditions that will insure that the precipitate will be dispersed or finely divided and that will make it possible by adjustment of the conditions under which the precipitate is formed to control or determine physical properties of the resulting precipitate and then the precipitate so formed and possessing the desired physical properties will be separated from the mixture produced in the formation of the precipitate and will thereby or through other treatment be brought to the desired condition or state. In the practice of my invention a desired substance or a material from which it may readily be produced is precipitated in or in the presence of a protective agent or a solution thereof by a chemical reaction or by change of temperature or otherwise. The precipitate so formed will possess desirable physical characteristics different from the physical characteristics of a chemically similar precipitate precipitated in an aqueous solution that does not contain a protective agent. A precipitate so formed will be in a dispersed form or state as contrasted with a precipitate of agglomerate or flocculent or curdy or other undispersed form and other physical characteristics of the dispersed precipitate can be determined or controlled by regulation of the conditions under which the precipitate is formed. Thus, the physical characteristics of a dispersed precipitate so formed can be determined or controlled by regulation of the concentration of the solution with respect to the proportion of the protective agent present, by regulation of the temperature and of the rate of precipitation, by regulation (where the precipitate is produced by chemical action) of the concentration of the chemically reacting substances and the rate at which they are brought together in the presence of the protective agent, and by regulation of the time elapsing between the completion of the precipitation and the separation of the precipitate from the resulting mixture—the duration of such time, i. e., aging of the precipitate, having an important bearing upon the size of the dispersed particles produced by the precipitation. In controlling the physical characteristics, of a dispersed precipitate produced in accordance with my invention, by regulating the conditions under which the precipitate is produced, decreasing the concentration of the solution with respect to the proportion of the protective agent present causes the resulting precipitate to resemble more nearly a precipitate produced in mere aqueous solutions and increasing the concentration of the agent gives a greater dispersion of the precipitate and increases the difference between the precipitate formed in accordance with my invention and a precipitate formed in a mere aqueous solution. Similarly if a precipitate is quickly formed it consists of finer particles than a precipitate slowly formed. Also, if the precipitate is produced by chemical reaction between solutions it is coarse when those solutions are dilute and is finer if those solutions are concentrated. Also, if the precipitate is produced by gradually adding a precipitating agent at a slow rate the precipitate is coarse and it is finer if the reacting solutions are brought together quickly.

The aging of the precipitate by allowing it to stand before it is centrifugally separated from the mixture in which it is formed tends to cause uniformity in the size of the dispersed particles constituting the precipitate, particularly when the precipitate is in part soluble in the mixture; and increased temperature speeds up the aging of the precipitate. The aging, like the rate of reaction and concentration of the various constitutents of the mixture, so determines the physical characteristics of the precipitate and the duration of the aging step must be determined by test with a view to obtaining the desired physical characteristics. Similarly the concentration of the constitutents of a mixture, the temperature, and the rate of reaction, are matters to be determined by test.

In the practice of my invention precipitates are produced that comprise the desired substance or a material from which they may readily be made and the precipitates are dispersed and other desired physical characteristics are imparted to the precipitates by control or regulation of the conditions or circumstances under which the precipitates are formed, but such dispersed precipitates can not be brought to a useful form or separated by gravity subsidence or filtration or other known methods of recovery or separation of precipitates from the mixture produced when the precipitate is formed but I have found that such dispersed precipitates of desired physical properties may nevertheless be separated or recovered in useful form from the resulting mixture by centrifugal subsidence effected in an imperforate centrifugal bowl. In the practice of my invention dispersed precipitates having desired physical characteristics are recovered or separated by centrifugal subsidence in an imperforate centrifugal bowl from the mixture produced in the formation of such precipitates. The substance so precipitated and separated or recovered by centrifugal subsidence constitutes the desired product of my invention or a material from which the desired product may be produced.

In the practice of my invention the protective agent employed will be selected in accordance with the precipitate sought or the substances from which the precipitate is produced by chemical action or change of temperature or otherwise and in accordance with the desired physical conditions of the dispersed product sought, and may consist of protective colloids or protective ions, it being understood that the colloids or ions must be so selected as to have a protective effect with respect to the precipitate as it is well known that the protective action of colloids and ions is selective. If the precipitate is formed in water use may be made of water-peptizable colloids such as gelatine, gum arabic, dextrine, soap, saponin, tragacanth and the like or use may be made of other colloids or semi-colloids including even colloidal sulphur, glycerine, sugar, starch, casein or the like, the water being acid or alkaline or neutral as may be required by the material employed, or use may be made of protective ions such as hydroxyl, hydrogen, hydrosulphide or other ions exerting the appropriate protective effect. If the precipitate is formed in a solvent other than water a protective agent will be selected that is effective in such solvent such as calcium acetate in an alcohol solvent, zinc or magnesium resinate in a benzene solvent, or calcium soaps or resinates in petroleum solvents.

In the production of white lead for use in paint by precipitation in accordance with my invention, glue or gelatine may be used as the protective colloid. An aqueous solution of the protective colloid may be employed, for example, an aqueous solution that is maintained at approximately 120° F. Into the desired colloidal solution is introduced a substance from which the precipitate is to be formed. For example, a lead salt may be introduced either as a solid or in solution, e. g., an aqueous solution of lead nitrate. In the practice of my invention precipitation may be effected by change of temperature or by addition of a reagent or otherwise. In the application of my invention to the production of white lead for use in paint precipitation may be effected by addition of a carbonate such as sodium carbonate. If, in the practice of my invention, precipitation is to be effected by means of a chemical reaction, either of the reagents may be added first to the colloidal solution, the second substance added preferably being in solution although both substances may be in solution.

The concentration of the resulting mixture with respect to the proportion of the protective agent present, and the temperature or rate and extent of change of temperature of the mixture, and the nature of the protective agent present, and the concentration of a substance or of substances from which the precipitate is formed, and the concentration and relative proportions of rate of mixture of substances reacting to produce the precipitate, and the rate of precipitation and also the period of time elapsing between completion of the reaction and the separation or recovery of the precipitate, are conditions that are regulated in the practice of my invention to control the physical properties of the resulting precipitate, the presence of the protective agent insuring that the desired substance will be recovered as dispersed particles as compared with an agglomerate, flocculent or curdy precipitate produced from an aqueous solution in the absence of a protective agent. The character and extent of regulation of the above mentioned conditions will vary in the production of different substances and will vary with the particular physical properties desired in the final product, and such regulation will be determined by the operator in accordance with the principles herein set forth.

After completion of precipitation the dispersed precipitate will be suspended in the solution containing the protective agent. Thus in the manufacture of white lead for use in paint, basic lead carbonate will be suspended in the colloidal solution and that solution will also contain other soluble products of the reaction. The precipitate of basic lead carbonate suitable for use in paint can not be separated by gravity separation or filtration or other known methods of separation from the mixture produced in the precipitation thereof that contains the protective colloid but I have discovered that the precipitate may be readily separated or recovered from such mixture by centrifugal subsidence in an imperforate bowl. Such centrifugal subsidence may be carried out by means of devices that are capable of continuously discharging all of the constituents of the mixture after separation, or by centrifugal devices that retain part of the mixture within an imperforate bowl. If the protective agent be such as will form a gel upon cooling, the mixture should be passed, while still hot enough to be liquid, through the centrifugal machine. Thus, a reference herein to a dispersed or highly dispersed precipitate is intended as a reference to a precipitate that does not settle by gravity at a workable rate, and is not removable by filtration at such a rate, from the liquid in which it is suspended. The fact that the precipitate is in this sense not removable by settling or by filtration is due to the high degree of dispersion of the precipitate, because it is formed in the presence of a protective agent, and not solely due to any enmeshing action by the protective agent, although colloidal protective agents may act to some extent in keeping the solid particles in suspension. In spite of the fact that the precipitate produced in accordance with my invention cannot be separated from the resulting mixture by filtration or gravity settling, the readiness with which the precipitate may be recovered or separated by centrifugal separation makes it possible to produce in accordance with my invention a desired substance in the form of dispersed particles having the desired size and other desired physical characteristics.

If a protective colloid is used the dispersed product recovered by centrifugal separation may have some of the protective colloid adhering to it but this may be removed by washing with water or with a suitable solvent at a suitable temperature and then the dispersed product can be separated from the wash liquid by gravity or by filtration, or centrifugally.

If a gel forming protective colloid is used the solution of protective colloid and any other soluble substance produced by the precipitation, that is discharged from the centrifugal separator, may be treated to gel the protective colloid, as by cooling. Then the solid colloid is washed and may be re-used in the practice of my invention. Obviously in the practice of my invention the protective agent must be in a condition in which its protective characteristics are effective; and to that end the concentration of the solution from or in which the precipitate is formed must be such that ionization exists if protective ions are relied upon and must be such that a colloid is in suspension or solution or colloidal solution if the protective agent is a colloid. A protective agent that is in such effective condition is referred to herein as an active protective agent, as contrasted with a protective agent that would not be effective, such as glue introduced into a non-solvent such as naphtha.

Other examples of the application of my invention will occur to those skilled in the art but as further illustration of the application of my invention lead chromate or mercury oxide may be precipitated in dispersed form in the presence of a protective agent uch as glue and recovered as a dispersed substance and cadmium sulphide may be precipitated in dispersed form in the presence of a protective agent such as hydrosulphide ions, the dispersed precipitate being recovered in each instance by centrifugal subsidence as a dispersed substance in a desired and useful condition from the mixture resulting from the precipitation.

From the foregoing it appears that by the practice of my invention dispersed substances may be produced by precipitation and the conditions under which the precipitation occurs may be so controlled that the resulting dispersed product possesses the desired physical properties, and the recovery of the precipitate may readily be effected, and so effected that the aging of the precipitate may be controlled, and the desired dispersed substance may ultimately be recovered in a useful state.

As a specific example of the practice of my invention basic lead carbonate may be precipitated from a 5% solution of lead nitrate in the presence of a 3% solution of gelatine by adding a sufficient quantity of 20% sodium carbonate solution to effect the precipitation. The rate of reaction and temperature and other features of control must be determined by test to produce a precipitate of desired degree of dispersion. A centrifugal machine having an imperforate bowl in which separation is effected by subsidence and whereby my invention may be carried out is shown in the patent to P. T. Sharples No. 1,232,104 of July 3rd, 1917.

While I have referred to the production of certain specific dispersed substances in accordance with my invention I have nevertheless set forth the principles and instructions for the general practice of my invention, and it is to be understood that my invention is not limited to the production of the specific substances referred to but includes the general practice of my invention and such modifications and variations as fall within the hereunto appended claims. In this connection it is to be pointed out that the practice of my invention is particularly applicable to the production of substances when it is desired that those substances shall possess certain physical characteristics and particularly when it is desired that the substances produced shall consist of dispersed particles of definite magnitude.

What I claim and desire to secure by Letters Patent of the United States is:

1. The process of producing white lead which comprises separately introducing a water-soluble lead salt and a water-soluble carbonate into a solution containing an active protective agent and centrifugally separating the precipitate from the resulting liquid mixture containing the protective agent.

2. The process of producing white lead which comprises reacting a water-soluble lead salt with a water-soluble carbonate in a solution containing an active protective agent and thereby forming a highly dispersed precipitate comprising white lead, and centrifugally separating the precipitate from the resulting liquid mixture containing the protective agent.

3. The process of producing pigments which comprises precipitating the pigment from a solution containing an active protective agent and thereby producing a suspension of the pigment in highly dispersed form in the resulting liquid mixture, and subjecting the suspension to centrifugal subsidence while maintaining the precipitate therein in deflocculated form and thereby separating the pigment in deflocculated form from the liquid containing the protective agent.

In testimony whereof, I have signed my name to this specification.

LEO D. JONES.